No. 830,834. PATENTED SEPT. 11, 1906.
H. J. HUDSON.
DISPLAY APPARATUS.
APPLICATION FILED SEPT. 19, 1905.

4 SHEETS—SHEET 1.

Witnesses
L. H. Sager.
Geo. N. Kerr.

Henry J. Hudson Inventor
By his Attorney
C. N. Edwards

No. 830,834. PATENTED SEPT. 11, 1906.
H. J. HUDSON.
DISPLAY APPARATUS.
APPLICATION FILED SEPT. 19, 1905.

4 SHEETS—SHEET 3.

Witnesses
L. H. Sager.
Geo. N. Kerr.

Henry J. Hudson, Inventor
By his Attorney C. N. Edwards

No. 830,834. PATENTED SEPT. 11, 1906.
H. J. HUDSON.
DISPLAY APPARATUS.
APPLICATION FILED SEPT. 19, 1905.
4 SHEETS—SHEET 4.
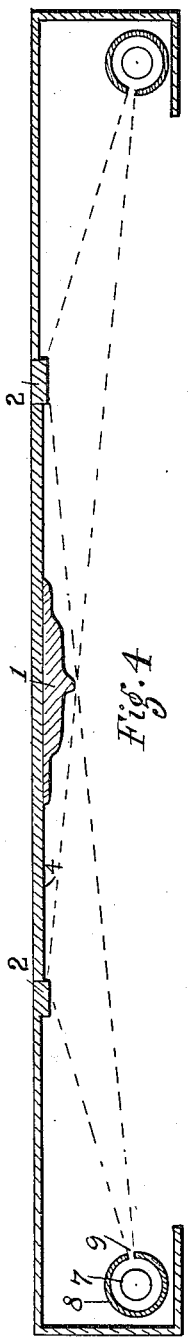
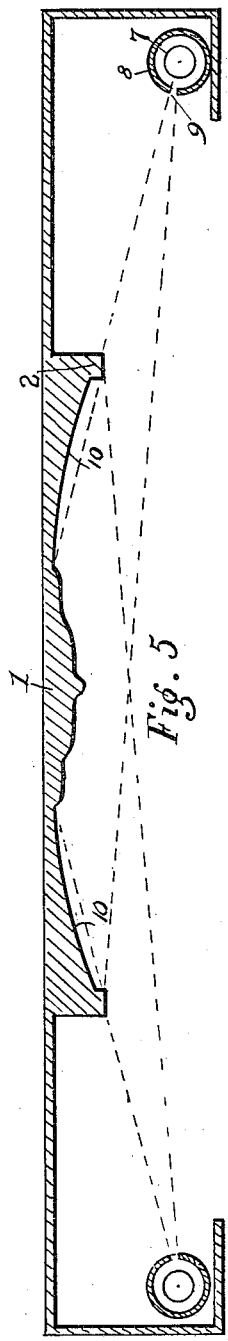
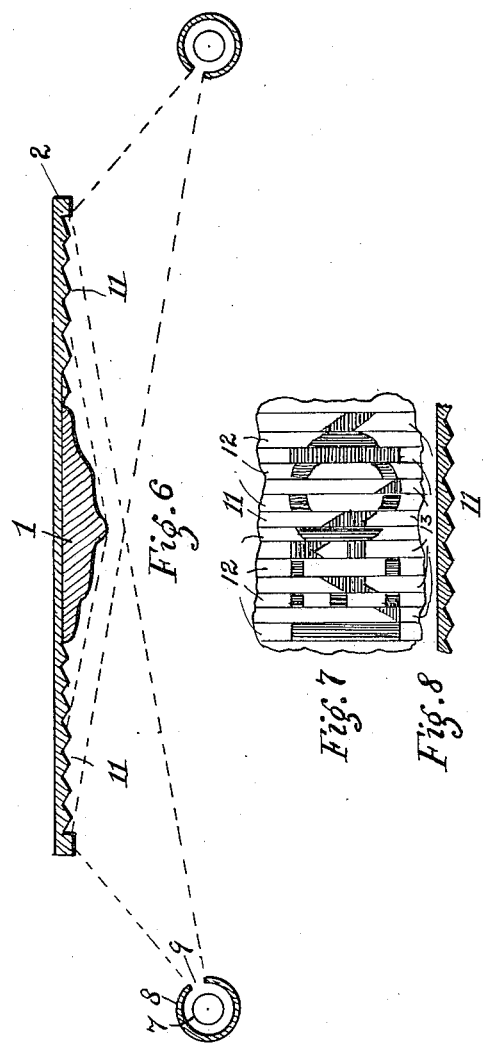

UNITED STATES PATENT OFFICE.

HENRY JOHN HUDSON, OF LONDON, ENGLAND.

DISPLAY APPARATUS.

No. 830,834.  Specification of Letters Patent.  Patented Sept. 11, 1906.

Application filed September 19, 1905. Serial No. 279,131.

*To all whom it may concern:*

Be it known that I, HENRY JOHN HUDSON, a subject of the King of Great Britain, residing at South Kensington, London, England, have invented certain new and useful Improvements in Display Apparatus, of which the following is a full, clear, and exact specification.

This invention relates to display apparatus, and more particularly has reference to display apparatus in which varied and novel effects may be produced by the peculiar formation of a figure, object, or the like, in combination with a variable illumination of such figure, object, or the like.

In general the invention consists in forming an object or model with what I will term a "profile" or "medial" line, which will be more or less distinct, according to the nature of the object, and on either side of this profile or medial line providing surfaces either of like or unlike contour, together with lighting devices so located as to illuminate one of these surfaces at a time, leaving the other surface partially or wholly dark, according to the contour of the object, model, or the like at the profile line. By this it results that the illuminated side appears very distinctly, and in the case of models of human or animal faces susceptible of different expressions the dark or indistinct side is pieced out by the sense of the observer, so that an impression as of seeing an entire symmetrical face is presented having the expression of the illuminated side. If now the lighting be reversed, an entirely different effect will be produced, because of the different surface illuminated, so that by alternately lighting the dissimilar sides entirely unexpected and novel effects may be produced because of the illusion created.

In the embodiment of the invention illustrated herein a statuesque, bas-relief, or intaglio model of a human face is prepared, in which the right and left sides are dissimilar or unsymmetrical, one side bearing, for example, a troubled expression and the other an amused or joyful expression. In some cases the models may thus represent entirely different persons, so as to permit of one side being alternately illuminated without the other to produce the desired effects.

Figure 1:
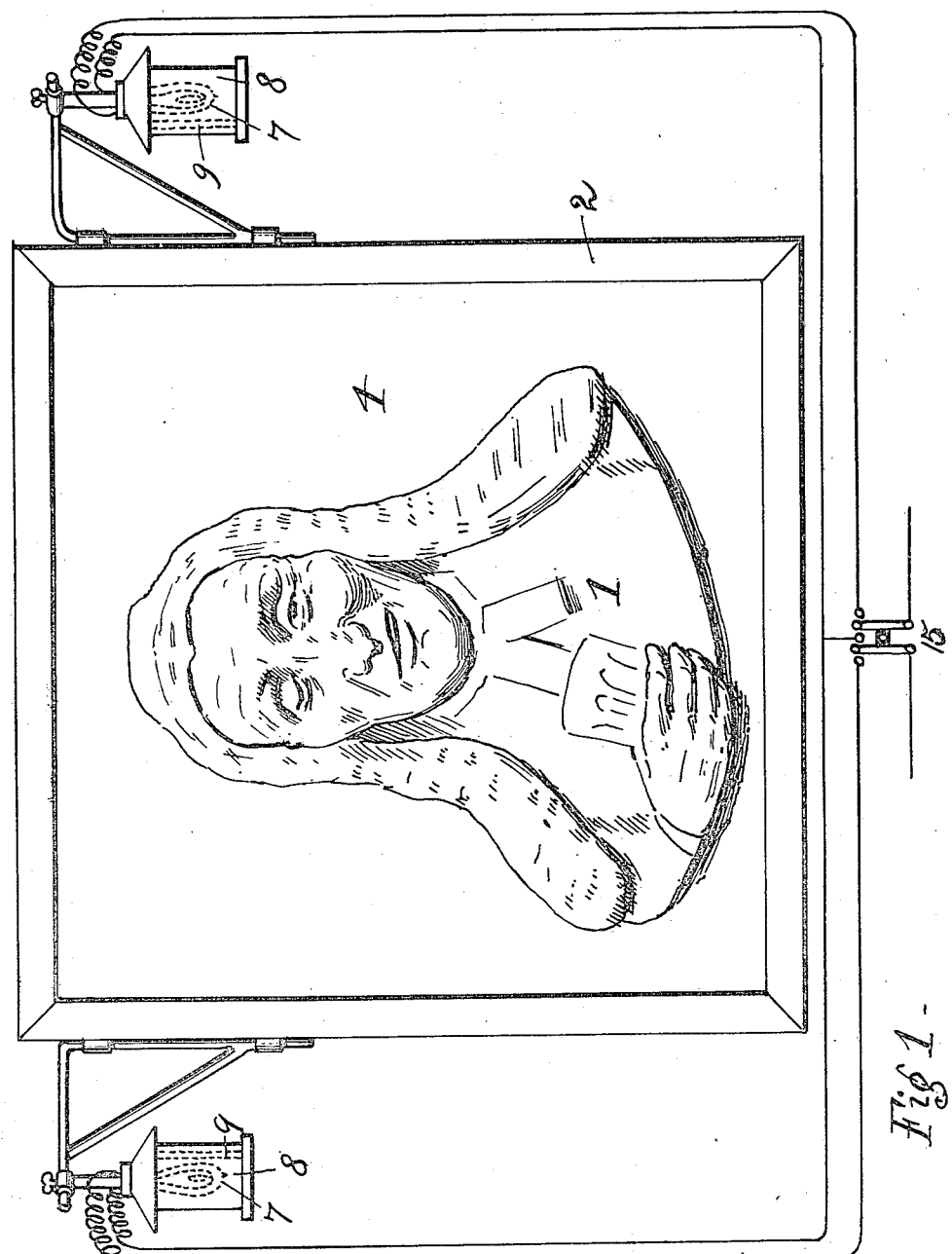
Figure 2:
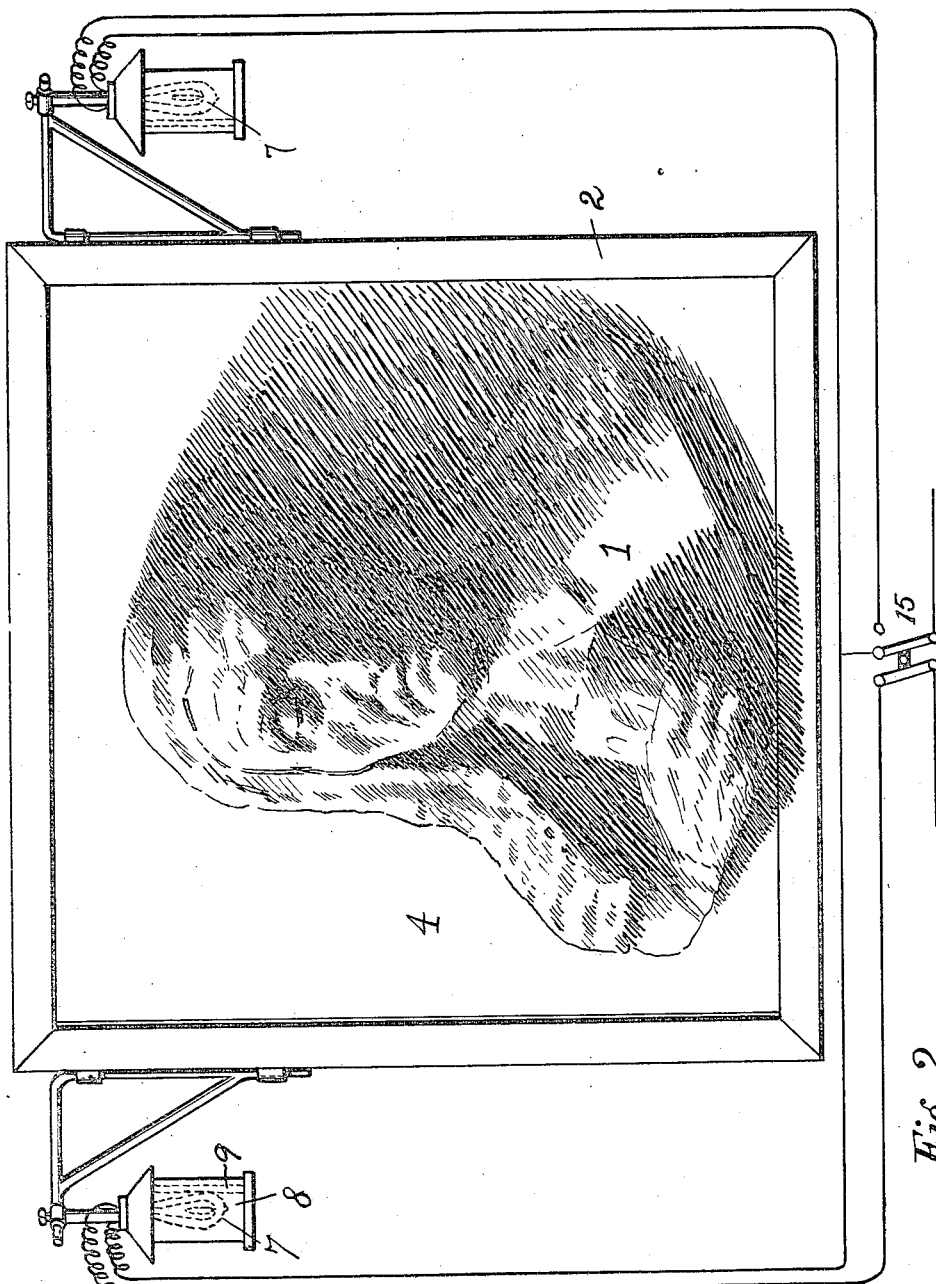
Figure 3:
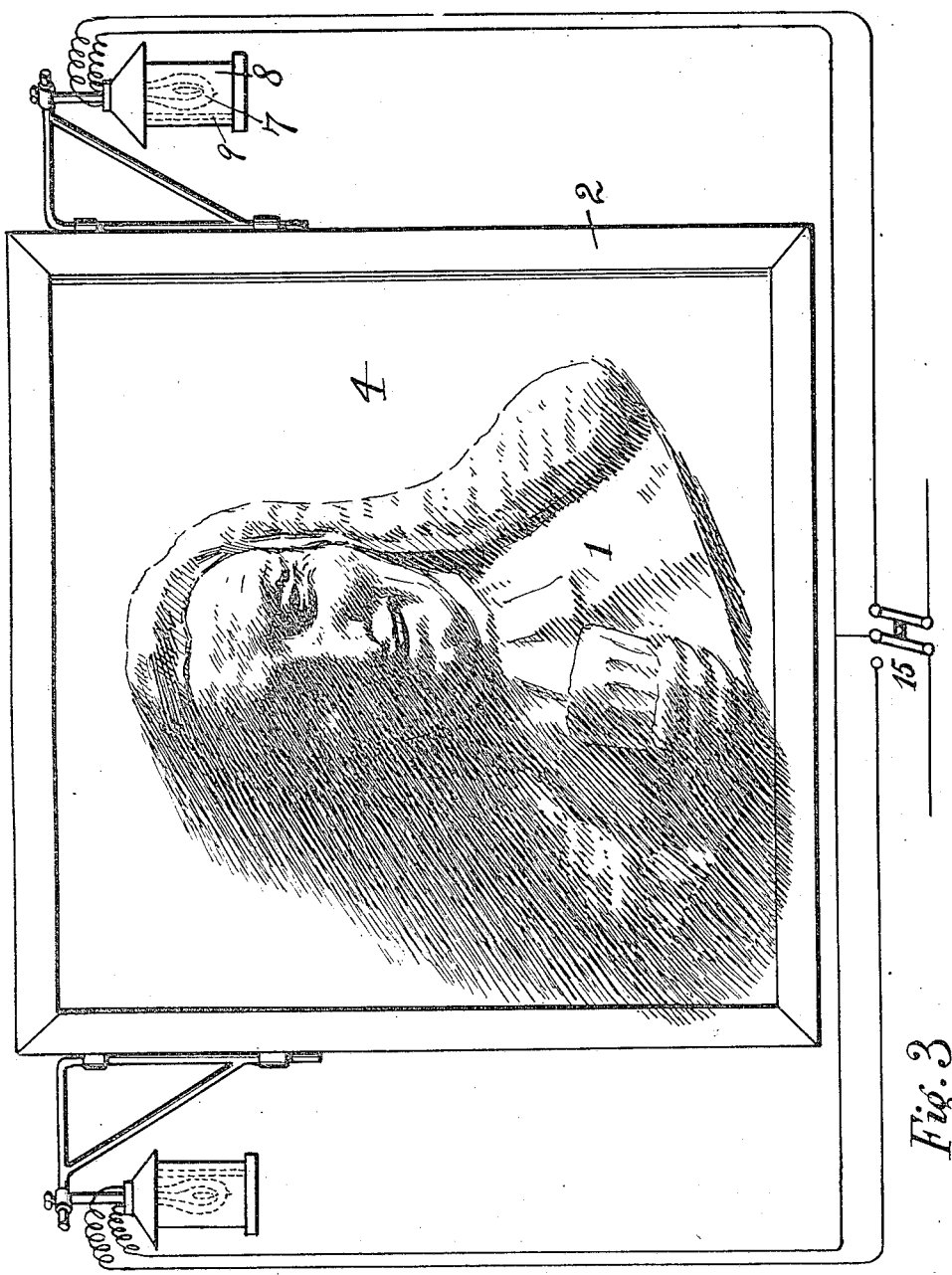

Figure 1 represents a perspective front view of a model of a human face having dissimilar expressions on the right and left sides and also an arrangement of lighting devices. Fig. 2 shows the right side of the model illuminated, representing, for example, a troubled expression. Fig. 3 shows the left side of the model illuminated, representing, for example, a joyous expression. Fig. 4 shows the path of the light-rays, together with a sectional view of the model and background. Fig. 5 is a similar view, except that the background is curved so as to be partially dark when the model is lighted. Fig. 6 is similar to Fig. 4, except that it shows a modified application of my invention to corrugated surfaces adapted to exhibit different descriptive matter when alternately illuminated. Fig. 7 shows a plan view, on an enlarged scale, of the corrugated surface; and Fig. 8 is a cross-section of Fig. 7.

Referring to Fig. 1, the model 1 is represented as contained within a frame 2 and preferably having a contrasting background 4, containing, if desired, suitable advertising or descriptive matter. As shown in Fig. 1, one side of the model is modeled differently from the other, so as to have different expressions, and when separately illuminated produce different effects, as shown in Figs. 2 and 3, Fig. 2 showing a troubled expression and Fig. 3 the opposite. From an inspection of these two figures separately it will be seen that the sense of the observer in a measure completes the picture on the shaded side, thus giving the illusion that an entire face is seen, similar in each case to the illuminated portion, whereas the shaded side can be seen, if at all, only in dim outline. This effect appears much more plainly where a bas-relief model is used, for instance, and actually illuminated than it does in the drawings, though in the latter the effect described appears. The bas-relief, model, or like object is preferably to be exhibited in a dark room, and for this purpose is mounted in the frame 2, the background 4 being preferably of dark color, so as to contrast with the light side of the model and harmonize with the dark side.

Located at each side of the model 1 within the frame are one or more lights 7, inclosed in a casing 8, which has a slot 9 for throwing a beam of light, the lights being so positioned that the beam of light will pass across the model, as in Figs. 4, 5, and 6, without strongly illuminating the surface beyond the shadow line. A better effect is produced if the shaded side receives some diffused light sufficient to indicate its general outlines, but this will of course depend upon how nearly alike the two sides are. By moving the lights nearer to or farther from the object the effect will be varied because of the variation in the shadows, and this may be accomplished by mounting the lights 7 so as to be movable relatively to the object and the background.

15 is a switch for alternately lighting the lights on each side.

In all cases the model or object will have a well-defined profile or shadow line which cuts off those rays of light which would otherwise strike and sharply illuminate the other side, besides giving character to the side illuminated. It will be understood that the lights may be varied in intensity as long as the far side of the model is not so strongly illuminated as to enable its different contour or expression to be distinguished, and I do not limit myself to any particular distance and location of lights except as may be necessary to accomplish my objects.

It will be understood that where I use the term "asymmetrical" in describing my invention I intend to include such apparatus as will produce the desired effect by reason of the dissimilar appearance or expression of the parts thereof without said parts necessarily differing in contour or modeling.

In Fig. 4 the background is shown as substantially plane on each side of the object, while in Fig. 5 it is partially hollowed, as at 10, so that a shadow will be cast which will vary the lighting of the background and create more of a contrast. In Fig. 6 a modified form of the invention is shown applied to the background, wherein 11 represents a corrugated surface composed of alternately-inclined faces the profile lines of which will be straight and inclined to each other at such angles that only the faces inclined in the same direction will be illuminated from one side at any given time. Each of these sets of inclined faces may have portions of letters thereon, as in Fig. 7, where, for example, the letters "E" "O" appear on the faces 12, and the letter "A" and a portion of the letter "M" on the faces 13. When the faces 12 are illuminated, the faces 13 will be dark, and vice versa. As seen from Fig. 6, this arrangement permits one set of words on both sides of the model to be illuminated, as well as one side of the model, and when the opposite side of the model is illuminated a different set of words will appear. By suitably locating words on the ordinary background of Figs. 4 and 5 they will appear whichever side of the model is illuminated.

The illusion of a complete face produced by lighting one side at a time is accentuated by permitting a slight interval of time between the extinguishing of the light on one side and the lighting on the other side, so that a momentary period of total obscurity intervenes. Instead of the solid background transparencies may be used and operated in any of the well-known ways, and variegated effects may be produced by variously coloring the surfaces to be illuminated or by coloring the lights themselves.

Inasmuch as innumerable designs of objects may be made which will be capable of exhibition by the method herein described and many other arrangements of lighting devices may be made the invention is not to be limited to the specific combination of elements herein described and illustrated, but is defined by the scope of the appended claims.

I claim—

1. A display apparatus comprising a body having two oppositely-disposed surfaces, in combination with means for lighting each surface in such a direction as to cause it to shade the other surface, and thereby produce effects varying according to the surface illuminated, said surfaces being visible from the same point, substantially as described.

2. A display apparatus comprising a model having two surfaces inclined to each other and meeting in a profile line, means for alternately lighting said surfaces in such directions as to cause each to be shaded by the other when lighted, and means permitting the direction of the light to be varied to vary the effect, substantially as described.

3. A display apparatus comprising a body having two surfaces with an intermediate raised portion, in combination with means for alternately lighting each of said surfaces in such a direction as to cause the raised portion to shade the other and thereby produce effects varying according to which side is lighted, substantially as described.

4. A display apparatus comprising a model having its opposite sides asymmetrical, in combination with means for lighting up the sides of the said model alternately in such directions as to cause one to shade the other, whereby an illusion is produced that different models are being used, substantially as described.

5. A display apparatus comprising a model having its sides dissimilarly modeled, in combination with lighting devices at each side of said model disposed in such positions as to light that side and shade the other side, and means whereby said lighting devices may be alternately lighted, substantially as described.

6. A display apparatus comprising a model having its sides dissimilarly modeled, in combination with lighting devices disposed on each side of the model and each located approximately in the plane of the model so as to light only one side, and means for alternately lighting said lighting devices, substantially as described.

7. A display apparatus comprising a model having its opposite sides asymmetrical, in combination with means for so lighting either of said sides singly that the other side will appear symmetrical with the illuminated side, substantially as described.

8. A display apparatus comprising an asymmetrical model mounted on a background, lighting devices on each side of the model adapted to light one side of the model and the background, the background having descriptive matter thereon, substantially as described.

9. A display apparatus comprising an asymmetrical model, a background therefor comprising a plurality of surfaces of which alternate ones are inclined in the same direction, in combination with lighting devices arranged to light one side of said model, and one group of said alternately-inclined surfaces, substantially as described.

10. A display apparatus comprising an asymmetrical bas-relief model mounted on a contrasting background, in combination with means for lighting the respective sides of said model singly, substantially as described.

11. A display apparatus comprising an asymmetrical bas-relief model mounted on a background comprising a corrugated surface having descriptive matter thereon, and means permitting the model and background to be alternately lighted from opposite sides to change the appearance of both the model and the descriptive matter, substantially as described.

12. A display apparatus comprising an asymmetrical model, a background having descriptive matter thereon, and means permitting the model and background to be alternately lighted from opposite sides to change the appearance of both the model and the descriptive matter, substantially as described.

13. A display apparatus comprising an asymmetrical model having an intermediate shadow-casting portion, and adapted to produce an illusion of change in expression according to the side illuminated, in combination with a background likewise changing in appearance as one or the other side of the model is illuminated, substantially as described.

14. As an article of manufacture, a bas-relief model for exhibition purposes, having the surfaces at either side of an approximate medial line modeled to have different expressions, substantially as described.

In testimony whereof I affix my signature in presence of two witnesses.

HENRY JOHN HUDSON.

Witnesses:
CHARLES H. LANDES,
W. MANDERSON LOBB.